(12) United States Patent
Li et al.

(10) Patent No.: US 11,962,662 B2
(45) Date of Patent: Apr. 16, 2024

(54) METHOD AND APPARATUS FOR PUSHING INFORMATION

(71) Applicant: Beijing Wodong Tianjun Information Technology Co., Ltd, Beijing (CN)

(72) Inventors: Weizhi Li, Beijing (CN); Ruiyang Zhang, Beijing (CN); Xianghong Luo, Beijing (CN); Changping Peng, Beijing (CN); Yongjun Bao, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 144 days.

(21) Appl. No.: 17/613,296

(22) PCT Filed: Mar. 26, 2020

(86) PCT No.: PCT/CN2020/081321
§ 371 (c)(1),
(2) Date: Nov. 22, 2021

(87) PCT Pub. No.: WO2020/233228
PCT Pub. Date: Nov. 26, 2020

(65) Prior Publication Data
US 2022/0224765 A1 Jul. 14, 2022

(30) Foreign Application Priority Data
May 23, 2019 (CN) .......................... 201910436186.8

(51) Int. Cl.
*H04L 67/56* (2022.01)
*G06F 16/9535* (2019.01)
(Continued)

(52) U.S. Cl.
CPC .............. *H04L 67/55* (2022.05); *G06N 7/01* (2023.01); *H04L 67/14* (2013.01);
(Continued)

(58) Field of Classification Search
CPC ..... H04L 67/55; H04L 67/14; H04L 67/2866; H04L 67/56; H04L 67/02; H04L 67/306;
(Continued)

(56) References Cited

U.S. PATENT DOCUMENTS

2014/0207609 A1 7/2014 Earhart et al.
2016/0132932 A1 5/2016 Lingvay
(Continued)

FOREIGN PATENT DOCUMENTS

CN 106649774 A 5/2017
CN 107172151 A 9/2017
(Continued)

OTHER PUBLICATIONS

First Chinese Office Action for Chinese Application No. 201910436186. 8, dated Mar. 2, 2021, 8 pages.
(Continued)

*Primary Examiner* — Quoc A Tran
(74) *Attorney, Agent, or Firm* — Buchanan Ingersoll & Rooney PC

(57) ABSTRACT

Embodiments of the present application disclose a method and an apparatus for pushing information. One embodiment of the method comprises: in response to the receipt of an information push request sent by a user by means of a terminal, determining object information about at least one object associated with user information included in the information push request; determining target push information according to the user information, the object information, and a pre-established information determination model, the information determination model being used for characterizing a correlation between user information, object information, and target push information; and pushing the target push information to the terminal for the user to view by means of the terminal.

16 Claims, 6 Drawing Sheets

(51) Int. Cl.
  *G06N 3/08* (2023.01)
  *G06N 7/01* (2023.01)
  *G06Q 30/06* (2023.01)
  *G06Q 30/0601* (2023.01)
  *H04L 65/40* (2022.01)
  *H04L 67/02* (2022.01)
  *H04L 67/14* (2022.01)
  *H04L 67/2866* (2022.01)
  *H04L 67/306* (2022.01)
  *H04L 67/55* (2022.01)

(52) U.S. Cl.
  CPC .......... *H04L 67/2866* (2013.01); *H04L 67/56* (2022.05); *G06F 16/9535* (2019.01); *G06N 3/08* (2013.01); *G06Q 30/06* (2013.01); *G06Q 30/0631* (2013.01); *G06Q 30/0633* (2013.01); *H04L 65/40* (2013.01); *H04L 67/02* (2013.01); *H04L 67/306* (2013.01)

(58) Field of Classification Search
  CPC . H04L 65/40; G06N 7/01; G06N 3/08; G06Q 30/0631; G06Q 30/0633; G06Q 30/06; G06F 16/9535
  See application file for complete search history.

(56) References Cited

U.S. PATENT DOCUMENTS

| | | | |
|---|---|---|---|
| 2017/0329856 A1* | 11/2017 | Jiang | ........................ G06N 7/01 |
| 2018/0276734 A1* | 9/2018 | Wu | ........................ H04L 67/55 |
| 2019/0335011 A1 | 10/2019 | Shi et al. | |
| 2019/0347708 A1 | 11/2019 | Min et al. | |
| 2020/0005782 A1 | 1/2020 | Li et al. | |

FOREIGN PATENT DOCUMENTS

| | | | | |
|---|---|---|---|---|
| CN | 107341238 A | | 11/2017 | |
| CN | 108268934 A | | 7/2018 | |
| CN | 108933730 A | | 12/2018 | |
| CN | 108959319 A | | 12/2018 | |
| CN | 109495552 A | | 3/2019 | |
| CN | 109582903 A | | 4/2019 | |
| CN | 109819002 A | * | 5/2019 | |
| WO | WO-2020233228 A1 | * | 11/2020 | ......... G06F 16/9535 |

OTHER PUBLICATIONS

International Search Report and Written Opinion for International Application No. PCT/CN2020/081321, dated Jun. 4, 2020, 5 pages.
Second Chinese Office Action for Chinese Application No. 201910436186.8, dated Aug. 2, 2021 with translation, 18 pages.

* cited by examiner

METHOD AND APPARATUS FOR PUSHING INFORMATION

This patent application is a U.S. National Stage of International Application No. PCT/CN2020/081321, filed on Mar. 26, 2020, which claims the priority from Chinese Patent Application No. 201910436186.8, filed on May 23, 2019, the contents of each of which applications are hereby incorporated by reference in their entireties.

TECHNICAL FIELD

Embodiments of the present disclosure relate to the field of computer technology, and specifically to a method and apparatus for pushing information.

BACKGROUND

With the expansion of network business, more and more websites provide a user with a large amount of to-be-pushed information. The existing approach is that a website provides all information to all users.

SUMMARY

Embodiments of the present disclosure propose a method and apparatus for pushing information.

According to a first aspect, some embodiments of the present disclosure provide a method for pushing information, the method includes: in response to receiving an information push request sent through a terminal by a user, determining object information of at least one object associated with user information included in the information push request; determining target push information based on the user information, the object information and a pre-established information determination model, the information determination model being used to represent a corresponding relationship between user information, object information and target push information; and pushing the target push information to the terminal, for the user to view the target push information through the terminal.

According to a second aspect, some embodiments of the present disclosure provide an apparatus for pushing information, the apparatus includes: an object information determining unit, configured to determine, in response to receiving an information push request sent through a terminal by a user, object information of at least one object associated with user information included in the information push request; a push information determining unit, configured to determine target push information based on the user information, the object information and a pre-established information determination model, the information determination model being used to represent a corresponding relationship between user information, object information and target push information; and an information pushing unit, configured to push the target push information to the terminal, for the user to view the target push information through the terminal.

According to a third aspect, some embodiments of the present disclosure provide a server, the server includes: one or more processors; and a storage apparatus, configured to store one or more programs, where the one or more programs, when executed by the one or more processors, cause the one or more processors to implement the method according to any one of the embodiments in the first aspect.

According to a fourth aspect, some embodiments of the present disclosure provide a computer readable medium, storing a computer program thereon, where the computer program, when executed by a processor, implements the method according to any one of the embodiments in the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure are further described below in detail by combining the accompanying drawings. It may be appreciated that the specific embodiments described herein are merely used for explaining the relevant invention, rather than limiting the invention. In addition, it should also be noted that, for ease of description, only the parts related to the relevant invention are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

Figure 1:
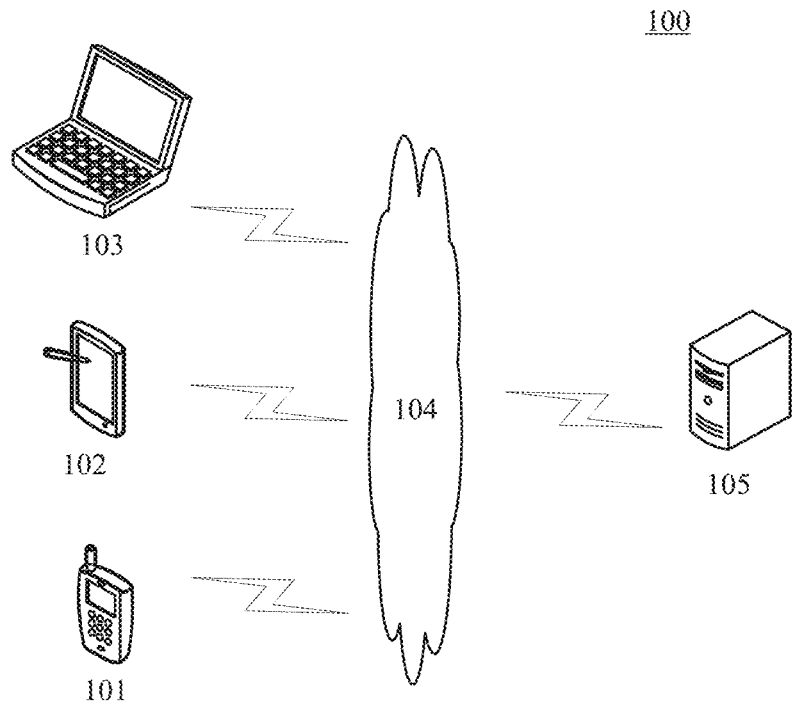
FIG. 1 is a diagram of an exemplary system architecture in which an embodiment of the present disclosure may be applied.

FIG. 1 illustrates an exemplary system architecture 100 in which a method for pushing information or an apparatus for pushing information according to embodiments of the present disclosure may be applied.

As shown in FIG. 1, the system architecture 100 may include terminal device(s) 101, 102, 103, a network 104 and a server 105. The network 104 serves as a medium providing a communication link between the terminal device(s) 101, 102, 103 and the server 105. The network 104 may include various types of connections, for example, wired or wireless communication links, or optical fiber cables.

A user may use the terminal device(s) 101, 102, 103 to interact with the server 105 via the network 104, to receive or send a message, etc. Various communication client applications (e.g., a web browser application, a shopping application, a search application, an instant communication tool, a mailbox client, and social platform software) may be installed on the terminal device(s) 101, 102, 103.

The terminal device(s) 101, 102, 103 may be hardware or software. When being the hardware, the terminal device(s) 101, 102, 103 may be various electronic devices having a display screen and supporting web browsing, the electronic devices including, but not limited to, a smartphone, a tablet computer, an e-book reader, an MP3 player (Moving Picture Experts Group Audio Layer III), an MP4 (Moving Picture Experts Group Audio Layer IV) player, a laptop portable computer, a desktop computer, etc. When being the software, the terminal device(s) 101, 102, 103 may be installed in the above listed electronic devices. The terminal device(s) may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend server providing support for a webpage displayed on the terminal device(s) 101, 102, 103. The backend server may perform processing such as an analysis on received data such as an information push request, and feed back a processing result (e.g., target push information) to the terminal device(s) 101, 102, 103.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be noted that the method for pushing information provided by the embodiments of the present disclosure is generally performed by the server 105. Correspondingly, the apparatus for pushing information is generally provided in the server 105.

It should be appreciated that the numbers of the terminal devices, the networks and the servers in FIG. 1 are merely illustrative. Any number of terminal devices, networks, and servers may be provided based on actual requirements.

Figure 2:
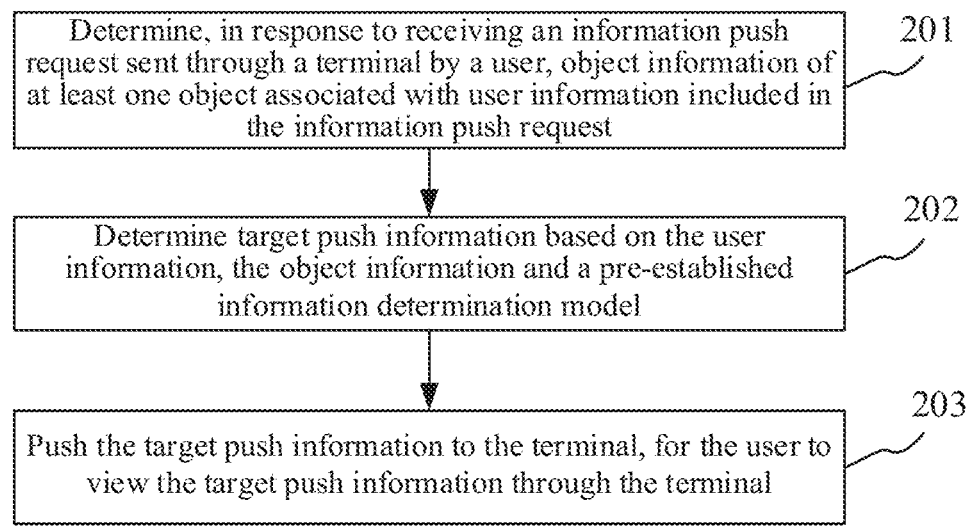
FIG. 2 is a flowchart of a method for pushing information according to an embodiment of the present disclosure.

Further referring to FIG. 2, FIG. 2 illustrates a flow 200 of a method for pushing information according to an embodiment of the present disclosure. The method for pushing information in this embodiment includes the following steps.

Step 201, in response to receiving an information push request sent through a terminal by a user, determining object information of at least one object associated with user information included in the information push request.

In this embodiment, an executing body (e.g., the server 105 shown in FIG. 1) of the method for pushing information may receive the information push request from the terminal, by means of a wired connection or a wireless connection. The above information push request may be sent by that the user clicks a certain button on a page displayed on the terminal, or sent when the user browses a page of a certain type. The above information push request includes the user information. Here, the user information may include a user name. After determining the user information, the executing body may determine the object information of at least one object associated with the user information. Here, the object may be an item sold on an e-commerce website, news published on a news website, music played on a music website, or the like. The object information may include information of an object browsed by the user, information of an object purchased by the user, an object followed with interest by the user, and the like.

It should be noted that, the above wireless connection may include, but not limited to, a 3G/4G connection, a WiFi connection, a Bluetooth connection, a WiMAX connection, a Zigbee connection, a UWB (ultra wideband) connection, and other wireless connections now known or developed in the future.

In some alternative implementations of this embodiment, the above information push request is automatically sent when the user browses a page of a preset type through the terminal.

In this implementation, the user may browse, through the terminal, various types of pages such as a page of a shopping type, a page of a music type, and the like. When the terminal detects that the type of the page browsed by the user is a preset type, the information push request may be sent to the executing body. For example, the user browses a commodity page through a shopping application installed on the terminal. When the terminal detects that the user is browsing a detail page, the information push request may be automatically sent to the server of the shopping application.

In some alternative implementations of this embodiment, the executing body may determine the object information of the at least one object associated with the user information based on at least one of: information of an object currently being browsed by the user, information of an object having been browsed by the user, information of an object favorited by the user, information of an object added into a shopping cart by the user, or information of an object followed with interest by the user.

In this implementation, for the shopping application, the executing body may use one or more of: information of an item currently being browsed by the user, information of an item having been browsed by the user, information of an item favorited by the user, information of an item added into a shopping cart by the user, or information of an item followed with interest by the user, as the object information of the at least one object associated with the user information.

Step 202, determining target push information based on the user information, the object information and a pre-established information determination model.

After determining the object information associated with the user information, the executing body may determine the target push information based on the user information, the object information, and the pre-established information determination model. Here, the information determination model is used to represent a corresponding relationship between user information, object information and target push information.

In this embodiment, the information determination model may be an artificial neural network, which abstracts the human brain neuron network from the perspective of information processing, establishes a simple model, and forms different networks according to different connection modes. The artificial neural network is composed of a large number of nodes (or neurons) connected to each other. Each node represents a specific output function, called an activation function. Each connection between two nodes represents a weighted value for the signal passing through the connection, which is called a weight (also referred to as a parameter). The output of the network varies according to the connection mode of the network, the weight value and the activation function. The artificial neural network usually includes a plurality of layers, and each layer includes a plurality of nodes. Generally, the weights of nodes in the same layer may be the same, and the weights of nodes in different layers may be different, and thus, the parameters of the plurality of layers of the artificial neural network may also be different. Here, the executing body may input the user information and the object information from the input side of the information determination model. The user information and the object information are sequentially processed (e.g., product, convolution) with the parameters of the layers in the information determination model, and then outputted from the output side of the information determination model. The information outputted from the output side is the target push information. The executing body may train the above information determination model in a variety of ways.

As an example, based on a corresponding relationship table recording a large number of corresponding relationships between user information, object information and target push information, the executing body may use the corresponding relationship table as the information determination model. In this way, the executing body may sequentially compare the user information and the object information with a plurality pieces of user information and a plurality pieces of object information recorded in the corresponding relationship table. If a piece of user information recorded in the corresponding relationship table is the same as the user information in the information push request, and a piece of object information recorded in the corresponding relationship table is the same as or similar to the object information associated with the user information in the information push request, the executing body may use a piece of corresponding target push information recorded in the corresponding relationship table as the target push information corresponding to the user.

Step 203, pushing the target push information to the terminal, for the user to view the target push information through the terminal.

After determining the target push information, the executing body may send the target push information to the terminal. In this way, the user may view the above target push information through the terminal. Here, the target push information may include at least one piece of object information.

Figure 3:
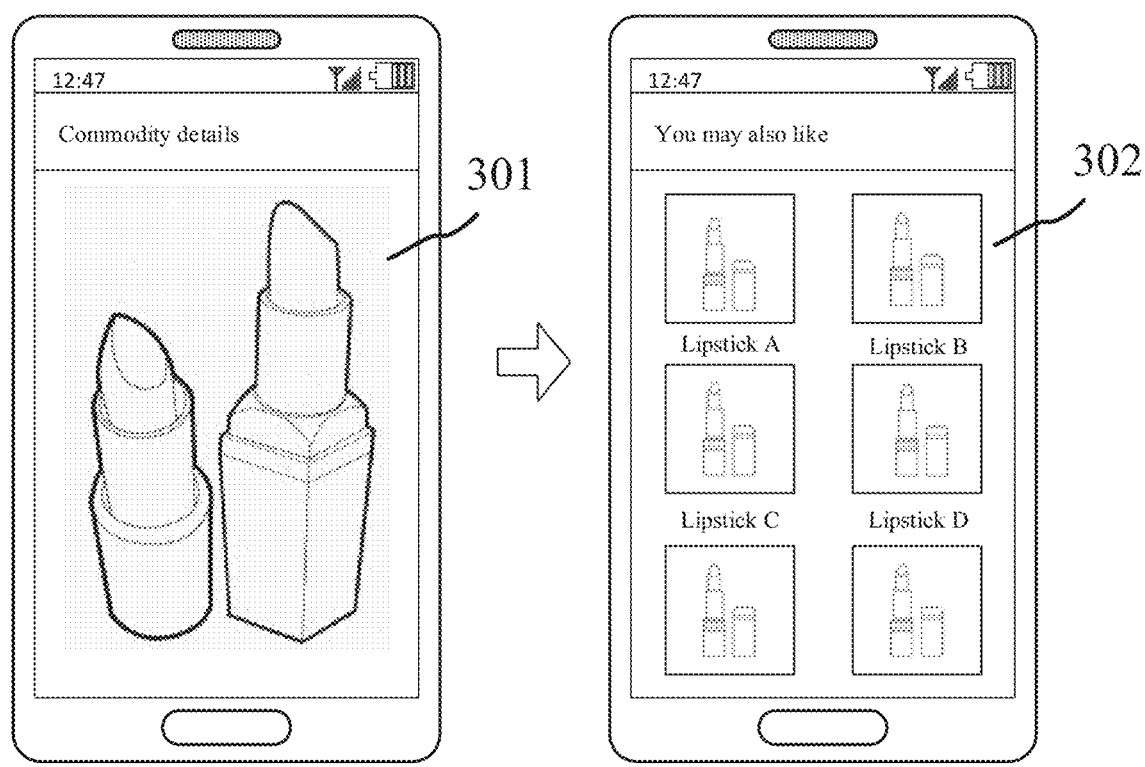
FIG. 3 is a schematic diagram of an application scenario of the method for pushing information according to the present disclosure.

Further referring to FIG. 3, FIG. 3 is a schematic diagram of an application scenario of the method for pushing information according to this embodiment. In the application scenario of FIG. 3, a user browses a detail page (as shown by page 301) of a certain lipstick through a shopping application installed on a terminal, at the same time, the terminal automatically sends an information push request to a server. Then, the server determines 24 pieces of commodity information through the processing in steps 201-203. The above 24 pieces of commodity information are pushed to the terminal. In this way, the user may view the above 24 pieces of commodity information at the bottom of the detail page by sliding the page, as shown by page 302.

According to the method for pushing information provided in the above embodiment of the present disclosure, after the information push request sent through the terminal by the user is received, the item information of the at least one item associated with the user information may be determined. The information push request includes the user information. Then, the target push information may be determined based on the user information, the item information and the pre-established information determination model. Here, the information determination model is used to represent corresponding relationship between the user information, the item information and the target push information. Finally, the target push information may be pushed to the terminal for the user to view the target push information through the terminal. According to the method in this embodiment, it is implemented that the information is pushed to the user with more pertinence.

Figure 4:
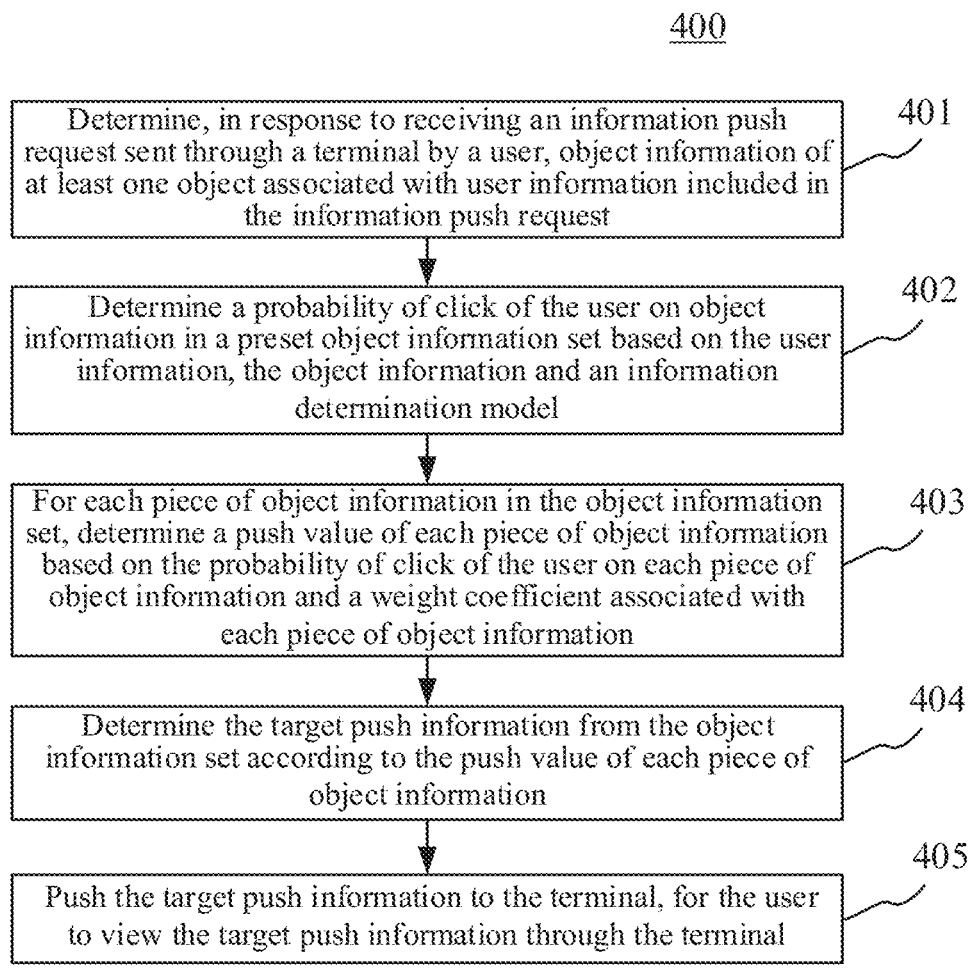
FIG. 4 is a flowchart of a method for pushing information according to another embodiment of the present disclosure.

Further referring to FIG. 4, FIG. 4 illustrates a flow 400 of a method for pushing information according to another embodiment of the present disclosure. As shown in FIG. 4, the method for pushing information in this embodiment may include the following steps.

Step 401, in response to receiving an information push request sent through a terminal by a user, determining object information of at least one object associated with user information included in the information push request.

The principle of this step is similar to that of step 201, which will not be repeatedly described here.

Step 402, determining a probability of click of the user on object information in a preset object information set based on the user information, the object information and an information determination model.

In this embodiment, after determining the object information of the at least one object associated with the user information, the executing body may determine the probability of click of the user on the object information in a preset object information set, based on the user information, the object information and the information determination model. Here, the information determination model is used to represent a corresponding relationship between user information, object information and a probability of click.

Here, the information determination model may be a deep learning model, which may include a plurality of layers, each layer is used to perform different processing on data. Particularly, the executing body may input the user information and the object information into the information determination model, and then the model outputs a probability of click of the user on each piece of object information in the preset object information set. Here, the preset object information set may include a plurality of pieces of to-be-pushed object information. For a shopping application, the above object information set may include a plurality of pieces of commodity information.

Step 403, for each piece of object information in the object information set, determining a push value of the each piece of object information based on the probability of click of the user on the each piece of object information and a weight coefficient associated with the each piece of object information.

After determining the probability of click of the user on the each piece of object information in the object information set, the executing body may calculate, in combination with the weight coefficient associated with the each piece of object information, a push value of each piece of push information. Particularly, for each piece of object information, the push value of the object information may be the product of the probability of click and the weight coefficient. For the shopping application, the above weight coefficient may be the price provided by an advertiser of a commodity. For a music application, the above weight coefficient may be a number of times of a single song listened by users.

Figure 4A:
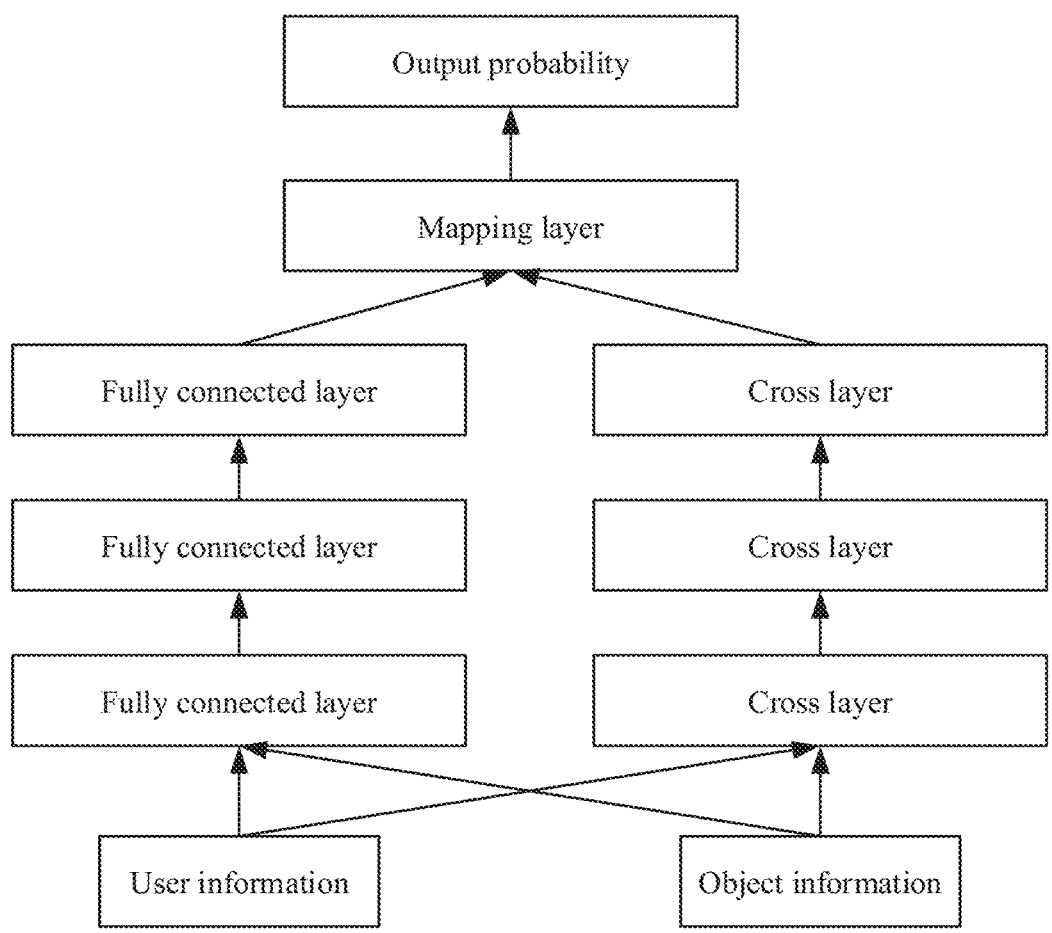
Figure 4B:
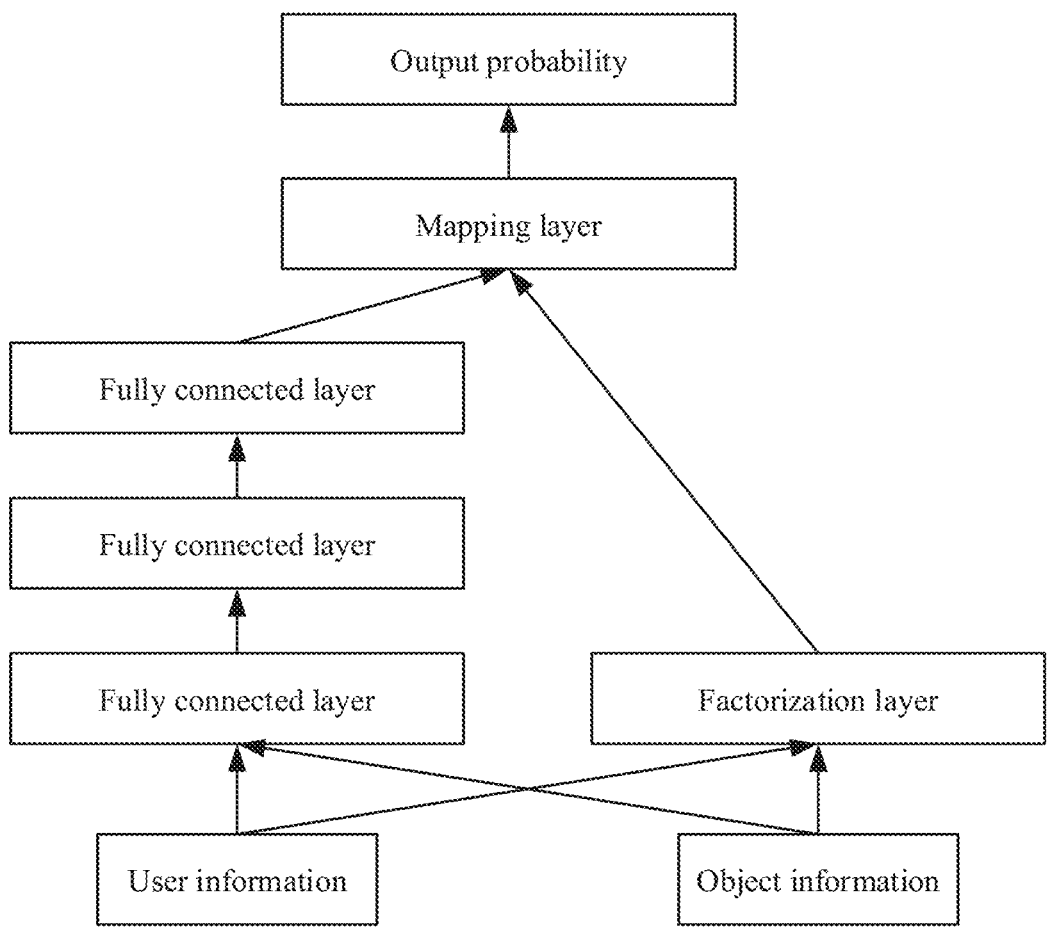

In some alternative implementations of this embodiment, the above information determination model may include a first determination model and a second determination model. Each of the first determination model and the second determination model may represent a corresponding relationship between the user information, the object information, and the probability of click. Particularly, the above first determination model may be a DCN (Deep Cross Networks), the diagram of the network structure of the DCN may be shown by FIG. 4a. The above second determination model may be a DeepFM (Deep Factorization Machines), the diagram of the network structure of the DeepFM may be shown by FIG. 4b.

For a piece of object information, the executing body may determine the probability of click of the user on the piece of object information through the following steps not shown in FIG. 4: determining a first probability of click of the user on the piece of object information based on the user information, the piece of object information and the first determination model; determining a second probability of click of the user on the piece of object information based on the user information, the piece of object information and the second determination model; and determining the probability of click of the user on the piece of object information based on the first probability of click, the second probability of click and preset weight coefficients.

In this implementation, the executing body may input the user information and the piece of object information into the first determination model and the second determination model respectively, and may respectively obtain the first probability of click and the second probability of click that are determined by the first determination model and the second determination model for the piece of object information. Then, the executing body may determine the probability of click of the user on the piece of object information based on the first probability of click, the second probability of click and the preset weight coefficients. The preset weight coefficients may include two coefficients, which are a first weight coefficient and a second weight coefficient respectively. The probability of click of the user on the piece of object information may be the sum of the product of the first probability of click and the first weight coefficient and the product of the second probability of click and the second weight coefficient.

In some alternative implementations of this embodiment, the first weight coefficient and the second weight coefficient may be determined through a linear convex optimization algorithm, and particularly, may be determined through an SLSQP (Sequential Least Squares Programming) optimization algorithm. The executing body may use a piece of object information clicked by a user as a positive sample, and use a piece of object information not clicked by a user as a negative sample. Then, based on two probabilities of click of the positive sample and the negative sample determined by the first determination model and the second determination model, the above SLSQP optimization algorithm is used to determine two weight coefficients $\alpha$ and $\beta$ in combination with a constraint condition $\alpha+\beta=1$.

It should be understood that, the executing body determining the weight coefficients may be the same as or different from the executing body in this embodiment. When the two executing bodies are different, the executing body determining the weight coefficients may send the determined weight coefficients to the executing body in this embodiment, for use by the executing body in the embodiment.

Step 404, determining the target push information from the object information set according to the push value of the each piece of object information.

After determining the push value of the each piece of object information, the executing body may sort the each piece of object information according to the push value. Then, according to a descending order, at least one piece of object information is determined from the object information set as the target push information. Alternatively, the executing body may use object information having a push value greater than a preset threshold value as the target push information.

Step 405, pushing the target push information to the terminal, for the user to view the target push information through the terminal.

The principle of this step is similar to that of step 203, which will not be repeatedly described here.

In some alternative implementations of this embodiment, the above information determination model may be trained and obtained through the following steps not shown in FIG. 4: acquiring a training sample set, a training sample including user information of a user, at least one piece of object information related to the user information, and a probability of click corresponding to the at least one piece of object information; and using the user information and the object information in the training sample in the training sample set as an input, and using the probability of click corresponding to the inputted object information as an expected output, to train and obtain the information determination model.

In this implementation, the executing body may first acquire the training sample set. The above training sample may include the user information of the user, at least one piece of object information related to the user information, and a probability of click corresponding to each piece of object information. During the training, the executing body may use the user information and the at least one piece of object information related to the user information as the input, and then use the probability of click corresponding to the inputted object information as the expected output, and thus may obtain the above information determination model.

It should be understood that, when the information determination model includes the first determination model and the second determination model, both the first determination model and the second determination model may be trained and obtained through the above steps.

In some alternative implementations of this embodiment, the above method may further include the following steps not shown in FIG. 4: acquiring click information of the user on the target push information; determining a probability of click corresponding to the target push information according to the click information; and using the user information, the target push information and the probability of click corresponding to the target push information as a new training sample, and training the information determination model using the new training sample.

In this implementation, after pushing the target push information to the terminal, the executing body may acquire the click information of the user on the above target push information. The above click information includes clicked and not clicked. The executing body may determine the probability of click corresponding to the target push information according to the above click information. It should be understood that, if a piece of object information in the target push information is clicked by a user, the probability of click corresponding to the piece of object information is 1. If a piece of object information in the target push information is not clicked by a user, the probability of click corresponding to the piece of object information is 0. The executing body may use the user information, the target push information and the probability of click corresponding to the target push information as the new training sample, and use the new training sample to continue to train the information determination model. Therefore, the information determination model may be updated in real time, thereby further improving the pertinence of pushed information.

According to the method for pushing information provided in the above embodiment of the present disclosure, two deep learning models may be used to respectively predict the probability of click of the user on each piece of object information, thereby improving the accuracy of the prediction. Moreover, the obtained probability of click may be combined with the weight coefficient associated with the each piece of object information to obtain the final target push information, thereby improving the click rate on the target push information.

Figure 5:
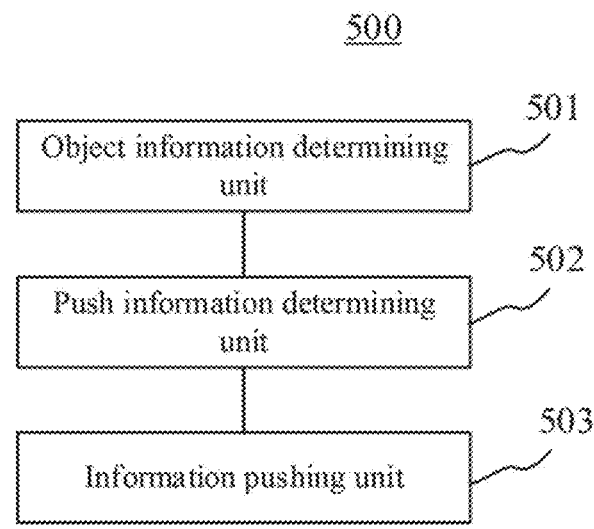
FIG. 5 is a schematic structural diagram of an apparatus for pushing information according to an embodiment of the present disclosure.

Further referring to FIG. 5, as an implementation of the method shown in the above drawings, an embodiment of the present disclosure provides an apparatus for pushing information. The embodiment of the apparatus corresponds to the embodiment of the method shown in FIG. 2. The apparatus may be applied in various electronic devices.

As shown in FIG. 5, the apparatus 500 for pushing information in this embodiment includes: an object information determining unit 501, a push information determining unit 502 and an information pushing unit 503.

The object information determining unit 501 is configured to determine, in response to receiving an information push request sent through a terminal by a user, object information of at least one object associated with user information included in the information push request.

The push information determining unit 502 is configured to determine target push information based on the user information, the object information and a pre-established information determination model, the information determination model being used to represent a corresponding relationship between user information, object information and target push information.

The information pushing unit 503 is configured to push the target push information to the terminal, for the user to view the target push information through the terminal.

In some alternative implementations of this embodiment, the information push request is automatically sent when the user browses a page of a preset type through the terminal.

In some alternative implementations of this embodiment, the object information determining unit 501 is further configured to: determine the object information of the at least one object associated with the user information based on at least one of: information of an object currently being browsed by the user, information of an object having been browsed by the user, information of an object favorited by the user, information of an object added into a shopping cart by the user, or information of an object followed with interest by the user.

In some alternative implementations of this embodiment, the push information determining unit 502 may further comprise a click probability determining module, a push value determining module and a push information determining module that are not shown in FIG. 5.

The click probability determining module is configured to determine a probability of click of the user on object information in a preset object information set based on the user information, the object information and the information determination model, the information determination model being used to represent a corresponding relationship between the user information, the object information and a probability of click.

The push value determining module is configured to determine, for each piece of object information in the object information set, a push value of the each piece of object information based on the probability of click of the user on the each piece of object information and a weight coefficient associated with the each piece of object information.

The push information determining module is configured to determine the target push information from the object information set according to the push value of the each piece of object information.

In some alternative implementations of this embodiment, the information determination model comprises a first determination model and a second determination model. The click probability determining module may be further configured to: for a piece of object information in the object information set, perform following operations: determining a first probability of click of the user on the piece of object information based on the user information, the piece of object information and the first determination model; determining a second probability of click of the user on the piece of object information based on the user information, the piece of object information and the second determination model; and determining the probability of click on the piece of object information based on the first probability of click, the second probability of click and preset weight coefficients.

In some alternative implementations of this embodiment, the apparatus 500 may further comprise a model training unit not shown in FIG. 5. The model training unit is configured to: acquire a training sample set, a training sample including user information of a user, at least one piece of object information related to the user information, and a probability of click corresponding to the at least one piece of object information; use the user information and a piece of object information in the training sample in the training sample set as an input, and use the probability of click corresponding to the inputted object information as an expected output, to train and obtain the information determination model.

In some alternative implementations of this embodiment, the apparatus 500 may further comprise a sample generating unit not shown in FIG. 5. The sample generating unit is configured to: acquire click information of the user on the target push information; determine a probability of click corresponding to the target push information according to the click information; and use the user information, the target push information and the probability of click corresponding to the target push information as a new training sample, and send the new training sample to the model training unit, to cause the model training unit to train the information determination model using the new training sample.

It should be appreciated that the units 501 to 503 in the apparatus 500 for pushing information respectively correspond to the steps in the method described with reference to FIG. 2. Therefore, the operations and features described above for the method for pushing information are also applicable to the apparatus 500 and the units contained therein, and thus will not be repeatedly described here.

Figure 6:
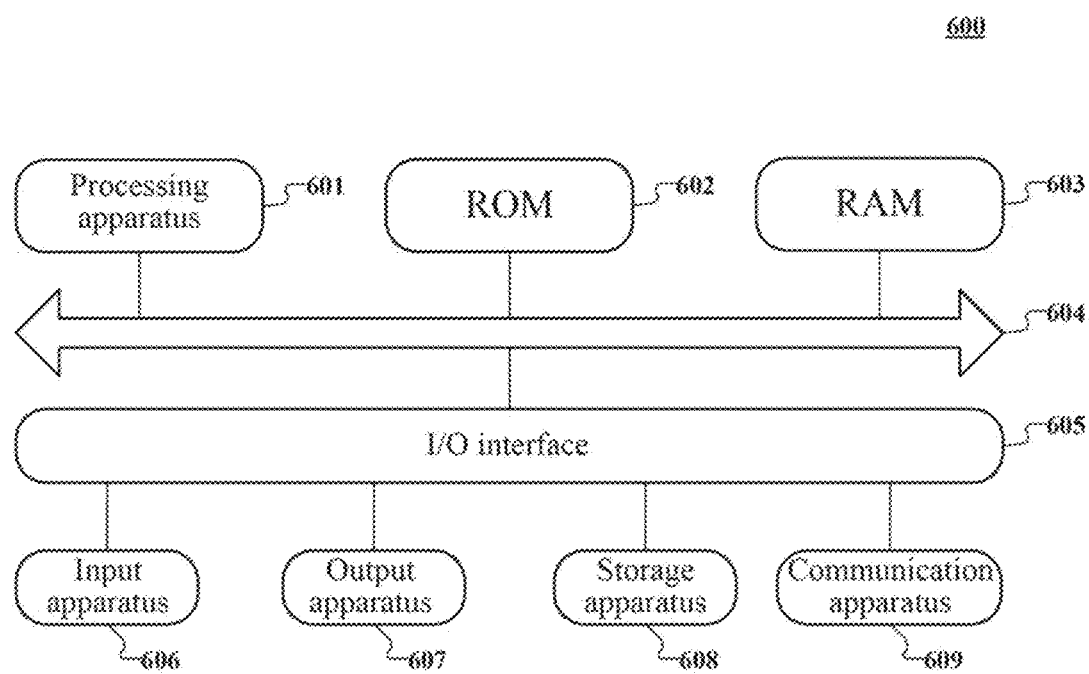
FIG. 6 is a schematic structural diagram of a computer system of a server adapted to implement embodiments of the present disclosure.

Referring to FIG. 6, FIG. 6 is a schematic structural diagram of an electronic device (e.g., the server shown in FIG. 1) 600 adapted to implement embodiments of the present disclosure. The server shown in FIG. 6 is merely an example, and should not bring any limitation to the functions and the scope of use of embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602 and the RAM 603 are connected to each other through a bus 604. An input/output (I/O) interface 605 is also connected to the bus 604.

Typically, the following apparatuses may be connected to the I/O interface 605: an input apparatus 606 including such as a touch screen, a touch pad, a keyboard, a mouse, a camera, a microphone, an accelerometer, or a gyroscope; an output apparatus 607 including such as a liquid crystal display (LCD), a speaker, a vibrator; the storage apparatus 608 including such as a magnetic tape, a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the illustrated apparatuses. It may alternatively be implemented or provided with more or fewer apparatuses. Each block shown in FIG. 6 may represent one apparatus, or may represent a plurality of apparatuses as needed.

In particular, according to embodiments of the present disclosure, the processes described above with reference to the flowcharts may be implemented in a computer software program. For example, an embodiment of the present disclosure includes a computer program product, which includes a computer program that is tangibly embedded in a computer-readable medium. The computer program includes program codes for performing the method as illustrated in the flowcharts. In such an embodiment, the computer program may be downloaded and installed from a network via the communication apparatus 609, or installed from the storage apparatus 608, or installed from the ROM 602. The computer program, when executed by the processing apparatus 601, implements the above mentioned functionalities as defined in the method of embodiments of the present disclosure. It should be noted that the computer readable medium in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In embodiments of the present disclosure, the computer readable storage medium may be any physical medium containing or storing programs which may be used by a command execution system, apparatus or element or incorporated thereto. In embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wire, optical cable, RF (radio frequency), etc., or any suitable combination of the above.

The above computer readable medium may be the computer readable medium included in the above server, or a stand-alone computer readable medium not assembled into the electronic device. The above computer readable medium carries one or more programs. The one or more programs, when executed by the electronic device, cause the electronic device to: determine, in response to receiving an information push request sent through a terminal by a user, object information of at least one object associated with user information included in the information push request; determine target push information according to the user information, the object information and a pre-established information determination model, the information determination model being used to represent a corresponding relationship between user information, object information and target push information; and pushing the target push information to the terminal, for the user to view the target push information through the terminal.

A computer program code for performing operations in embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through the Internet using an Internet service provider).

The flowcharts and block diagrams in the accompanying drawings illustrate architectures, functions and operations that may be implemented according to the systems, methods and computer program products of various embodiments of the present disclosure. In this regard, each of the blocks in the flowcharts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor comprising an object information determining unit, a push information determining unit and an information pushing unit. Here, the names of these units do not in some cases constitute a limitation to such units themselves. For example, the information pushing unit may alternatively be described as "a unit for pushing target push information to a terminal."

The above description only provides an explanation of the preferred embodiments of the present disclosure and the technical principles used. It should be appreciated by those skilled in the art that the inventive scope of embodiments of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. For example, technical solutions formed by the above-described features being interchanged with, but not limited to, technical features with similar functions disclosed in embodiments of the present disclosure.

What is claimed is:

1. A method for pushing information, comprising:
    in response to receiving an information push request sent through a terminal by a user, determining object information of at least one object associated with user information included in the information push request;
    determining target push information based on the user information, the object information and a pre-established information determination model, the information determination model being used to represent a corresponding relationship between user information, object information and target push information; and
    pushing the target push information to the terminal, for the user to view the target push information through the terminal,
    wherein the determining the target push information based on the user information, the object information and the pre-established information determination model comprises:
    determining a probability of click of the user on object information in a preset object information set based on the user information, the object information and the information determination model, the information determination model being used to represent a corresponding relationship between the user information, the object information and a probability of click;
    for each piece of object information in the object information set, determining a push value of the each piece of object information based on the probability of click of the user on the each piece of object information and a weight coefficient associated with the each piece of object information; and
    determining the target push information from the object information set according to the push value of the each piece of object information.

2. The method according to claim 1, wherein the information push request is automatically sent when the user browses a page of a preset type through the terminal.

3. The method according to claim 1, wherein determining the object information of the at least one object associated with the user information comprises:
    determining the object information of the at least one object associated with the user information based on at least one of: information of an object currently being browsed by the user, information of an object having been browsed by the user, information of an object favorited by the user, information of an object added into a shopping cart by the user, or information of an object followed with interest by the user.

4. The method according to claim 1, wherein the information determination model comprises a first determination model and a second determination model, and
    the determining the probability of click of the user on object information in the preset object information set according to the user information, the object information and the information determination model, the information determination model, comprises:
    for a piece of object information in the object information set, performing following operations: determining a first probability of click of the user on the piece of object information based on the user information, the piece of object information and the first determination model; determining a second probability of click of the user on the piece of object information based on the user information, the piece of object information and the second determination model; and determining the probability of click on the piece of object information based on the first probability of click, the second probability of click and preset weight coefficients.

5. The method according to claim 1, wherein the information determination model is obtained by training through:
    acquiring a training sample set, a training sample including user information of a user, at least one piece of object information related to the user information, and a probability of click corresponding to the at least one piece of object information; and
    using the user information and a piece of object information in the training sample in the training sample set as an input, and using the probability of click corresponding to the inputted object information as an expected output, to train and obtain the information determination model.

6. The method according to claim 5, further comprising:
    acquiring click information of the user on the target push information;
    determining a probability of click corresponding to the target push information according to the click information; and
    using the user information, the target push information and the probability of click corresponding to the target push information as a new training sample, and training the information determination model using the new training sample.

7. An apparatus for pushing information, comprising:
    one or more processors; and
    a storage apparatus, configured to store one or more programs,
    wherein the one or more programs, when executed by the one or more processors, cause the one or more processors to implement operations, the operations comprising:
    determining, in response to receiving an information push request sent through a terminal by a user, object information of at least one object associated with user information included in the information push request;
    determining target push information based on the user information, the object information and a pre-established information determination model, the information determination model being used to represent a corresponding relationship between user information, object information and target push information; and
    pushing the target push information to the terminal, for the user to view the target push information through the terminal, wherein the determining the target push information based on the user information, the object information and the pre-established information determination model comprises:

determining a probability of click of the user on object information in a preset object information set based on the user information, the object information and the information determination model, the information determination model being used to represent a corresponding relationship between the user information, the object information and a probability of click;

determining, for each piece of object information in the object information set, a push value of the each piece of object information based on the probability of click of the user on the each piece of object information and a weight coefficient associated with the each piece of object information; and determining the target push information from the object information set according to the push value of the each piece of object information.

8. The apparatus according to claim 7, wherein the information push request is automatically sent when the user browses a page of a preset type through the terminal.

9. The apparatus according to claim 7, wherein the determining the object information of the at least one object associated with the user information comprises:

determining the object information of the at least one object associated with the user information based on at least one of: information of an object currently being browsed by the user, information of an object having been browsed by the user, information of an object favorited by the user, information of an object added into a shopping cart by the user, or information of an object followed with interest by the user.

10. The apparatus according to claim 7, wherein the information determination model comprises a first determination model and a second determination model, and the determining the probability of click of the user on object information in the preset object information set according to the user information, the object information and the information determination model, the information determination model, comprises:

for a piece of object information in the object information set, performing following steps: determining a first probability of click of the user on the piece of object information based on the user information, the piece of object information and the first determination model; determining a second probability of click of the user on the piece of object information based on the user information, the piece of object information and the second determination model; and determining the probability of click on the piece of object information based on the first probability of click, the second probability of click and preset weight coefficients.

11. The apparatus according to claim 7, wherein the information determination model is obtained by training through:

acquiring a training sample set, a training sample including user information of a user, at least one piece of object information related to the user information, and a probability of click corresponding to the at least one piece of object information; and using the user information and a piece of object information in the training sample in the training sample set as an input, and using the probability of click corresponding to the inputted object information as an expected output, to train and obtain the information determination model.

12. The apparatus according to claim 11, wherein the operations further comprise:

acquiring click information of the user on the target push information;

determining a probability of click corresponding to the target push information according to the click information; and using the user information, the target push information and the probability of click corresponding to the target push information as a new training sample, and training the information determination model using the new training sample.

13. A computer readable medium, storing a computer program thereon, wherein the computer program, when executed by a processor, implements operations, the operations comprising:

in response to receiving an information push request sent through a terminal by a user, determining object information of at least one object associated with user information included in the information push request;

determining target push information based on the user information, the object information and a pre-established information determination model, the information determination model being used to represent a corresponding relationship between user information, object information and target push information; and pushing the target push information to the terminal, for the user to view the target push information through the terminal, wherein the determining the target push information based on the user information, the object information and the pre-established information determination model comprises:

determining a probability of click of the user on object information in a preset object information set based on the user information, the object information and the information determination model, the information determination model being used to represent a corresponding relationship between the user information, the object information and a probability of click;

for each piece of object information in the object information set, determining a push value of the each piece of object information based on the probability of click of the user on the each piece of object information and a weight coefficient associated with the each piece of object information; and determining the target push information from the object information set according to the push value of the each piece of object information.

14. The medium according to claim 13, wherein the information push request is automatically sent when the user browses a page of a preset type through the terminal.

15. The medium according to claim 13, wherein determining the object information of the at least one object associated with the user information comprises:

determining the object information of the at least one object associated with the user information based on at least one of: information of an object currently being browsed by the user, information of an object having been browsed by the user, information of an object favorited by the user, information of an object added into a shopping cart by the user, or information of an object followed with interest by the user.

16. The medium according to claim 13, wherein the information determination model comprises a first determination model and a second determination model, and the determining the probability of click of the user on object information in the preset object information set according to the user information, the object information and the information determination model, the information determination model, comprises:

for a piece of object information in the object information set, performing following operations: determining a first probability of click of the user on the piece of object information based on the user information, the piece of object information and the first determination model; determining a second probability of click of the user on the piece of object information based on the user information, the piece of object information and the second determination model; and determining the probability of click on the piece of object information based on the first probability of click, the second probability of click and preset weight coefficients.

* * * * *